US012620690B2

(12) United States Patent
Chiotellis et al.

(10) Patent No.: US 12,620,690 B2
(45) Date of Patent: May 5, 2026

(54) ELECTRONIC DEVICE HAVING CLUTCH BARREL ANTENNA ARM

(71) Applicant: Apple Inc., Cupertino, CA (US)

(72) Inventors: Nikolaos Chiotellis, San Jose, CA (US); Michael J Williams, Campbell, CA (US); Joel D Barrera, Cedar Park, TX (US); Marc Soriano Baliarda, San Jose, CA (US); Ayoub Yari Boroujeni, Redwood City, CA (US); Trevor J Edmonds, San Francisco, CA (US); Jerzy S Guterman, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 176 days.

(21) Appl. No.: 18/476,035

(22) Filed: Sep. 27, 2023

(65) Prior Publication Data

US 2025/0105490 A1 Mar. 27, 2025

(51) Int. Cl.

| | |
|---|---|
| ***H01Q 13/10*** | (2006.01) |
| ***H01Q 1/22*** | (2006.01) |
| ***H01Q 1/38*** | (2006.01) |
| ***H01Q 9/04*** | (2006.01) |

(52) U.S. Cl.

CPC ............. *H01Q 1/2266* (2013.01); *H01Q 1/38* (2013.01); *H01Q 9/0421* (2013.01)

(58) Field of Classification Search

CPC ...... H01Q 1/2266; H01Q 1/38; H01Q 9/0421; H01Q 13/10

See application file for complete search history.

(56) References Cited

U.S. PATENT DOCUMENTS

| | | | |
|---|---|---|---|
| 8,059,039 B2 | 11/2011 | Ayala Vazquez et al. | |
| 9,450,289 B2 | 9/2016 | Guterman et al. | |
| 9,531,071 B2 | 12/2016 | Guterman et al. | |
| 9,653,777 B2 | 5/2017 | Guterman et al. | |
| 10,268,236 B2 | 4/2019 | Guterman et al. | |
| 10,727,590 B2 | 7/2020 | Barrera et al. | |
| 10,978,806 B2 | 4/2021 | Garrido Lopez et al. | |
| 2010/0073242 A1* | 3/2010 | Ayala Vazquez ...... | H01Q 5/371 343/702 |

(Continued)

OTHER PUBLICATIONS

U.S. Appl. No. 17/832,465, filed Jun. 3, 2022.

*Primary Examiner* — David E Lotter

(74) *Attorney, Agent, or Firm* — Treyz Law Group, P.C.; Michael H. Lyons

(57) ABSTRACT

An electronic device such as a laptop computer may have an upper housing and a lower housing. The lower housing may have a clutch barrel coupled to the upper housing by a hinge. The upper housing may be rotatable relative to the lower housing between an open position and a closed position. The upper housing may have a curved metal surface facing the clutch barrel. The device may have an antenna with a radiating arm on a curved interior surface of a substrate in the clutch barrel. The radiating arm may extend parallel to the curved metal surface. The radiating arm may remain separated from the curved metal surface across its lateral area as the upper housing is rotated from the open position to the closed position. This may ensure that the antenna is provided with a uniform capacitive load from the upper housing at all upper housing positions.

20 Claims, 7 Drawing Sheets

(56) References Cited

U.S. PATENT DOCUMENTS

| | | | | |
|---|---|---|---|---|
| 2010/0073243 | A1* | 3/2010 | Ayala Vazquez .... | H01Q 1/2266 343/702 |
| 2012/0026048 | A1 | 2/2012 | Vazquez et al. | |
| 2015/0255851 | A1* | 9/2015 | Guterman ................ | H01Q 9/42 343/702 |
| 2015/0270599 | A1* | 9/2015 | Guterman ............. | H01Q 13/18 343/702 |
| 2023/0223681 | A1 | 7/2023 | Barrera et al. | |

* cited by examiner

ELECTRONIC DEVICE HAVING CLUTCH BARREL ANTENNA ARM

FIELD

This relates generally to electronic devices, including electronic devices with wireless communications capabilities.

BACKGROUND

Electronic devices such as portable computers and cellular telephones are often provided with wireless communications capabilities and displays. To satisfy consumer demand for small form factor wireless devices, manufacturers are continually striving to implement wireless communications circuitry such as antenna components using compact structures.

It can be challenging to form electronic device antenna structures with desired attributes. In some wireless devices, the presence of conductive housing structures can impact antenna performance. Device size can also affect performance. It can be difficult to achieve desired performance levels in a compact device, particularly when the compact device has conductive housing structures.

SUMMARY

An electronic device such as a laptop computer may have an upper housing and a lower housing. The lower housing may have a clutch barrel protruding from the lower housing. The upper housing may be coupled to the clutch barrel by a hinge. The upper housing may be rotatable relative to the lower housing between an open position and a closed position. The upper housing may have a curved metal surface facing the clutch barrel.

The laptop computer may have wireless circuitry with an antenna. The antenna may have a radiating arm on a curved interior surface of a substrate in the clutch barrel. The radiating arm may extend parallel to the curved metal surface. The radiating arm may remain separated from the curved metal surface across its lateral area as the upper housing is rotated from the open position to the closed position. This may ensure that the antenna is provided with a uniform capacitive load from the upper housing at all upper housing positions. This may minimize detuning and deterioration of antenna performance even when the upper housing is rotated to different positions over time.

DETAILED DESCRIPTION

Figure 1:
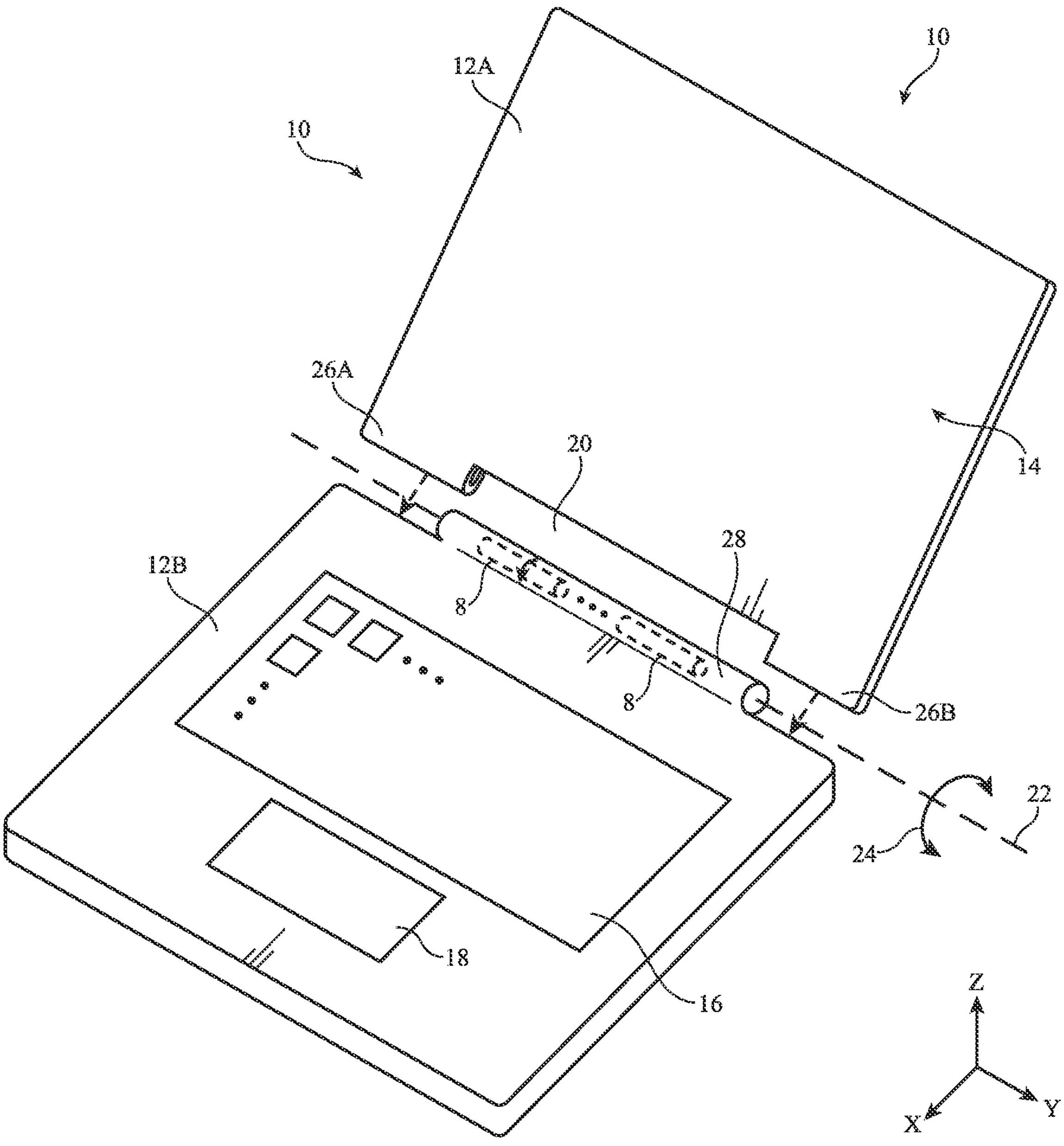
FIG. 1 is a perspective view of an illustrative electronic device such as a laptop computer having a clutch barrel in accordance with some embodiments.

An electronic device such as electronic device 10 of FIG. 1 may contain wireless circuitry. For example, electronic device 10 may contain wireless communications circuitry that operates in long-range communications bands such as cellular telephone bands and wireless circuitry that operates in short-range communications bands such as the 2.4 GHZ Bluetooth® or other wireless personal area network (WPAN) bands and the 2.4 GHz and 5 GHz Wi-Fi® band or other wireless local area network (WLAN) bands (sometimes referred to as IEEE 802.11 bands or wireless local area network communications bands). Device 10 may also contain wireless communications circuitry for performing near-field communications, communications at millimeter/centimeter wave frequencies, light-based wireless communications, satellite navigation system communications, or other wireless communications.

Device 10 may be a handheld electronic device such as a cellular telephone, media player, gaming device, or other device, may be a laptop computer, tablet computer, or other portable computer, may be a desktop computer, may be a computer display, may be a display containing an embedded computer, may be a television or set top box, wireless base station, wireless access point, home entertainment console, portable speaker, gaming accessory, wristwatch device, head-mounted display device, or other wearable device, or may be other electronic equipment. Configurations in which device 10 has a rotatable lid as in a portable (e.g., laptop) computer are sometimes described herein as an example. This is, however, merely illustrative. Device 10 may be any suitable electronic equipment.

As shown in the example of FIG. 1, device 10 may have a housing such as housing 12. Housing 12 may be formed from plastic, metal (e.g., aluminum), fiber composites such as carbon fiber, glass, ceramic, other materials, and combinations of these materials. Housing 12 or parts of housing 12 may be formed using a unibody construction in which housing structures are formed from an integrated piece of material. Multipart housing constructions may also be used in which housing 12 or parts of housing 12 are formed from frame structures, housing walls, and other components that are attached to each other using fasteners, adhesive, and other attachment mechanisms.

As shown in FIG. 1, device 10 may have input-output devices such as track pad 18 (e.g., a touch pad, mouse, other touch-based user input device) and keyboard 16 (e.g., having a set of mechanical and/or electronic-based keys and/or a touch screen display). Device 10 may also have components such as cameras, microphones, speakers, buttons, status indicator lights, buzzers, sensors, and other input-output devices. These devices may be used to gather input for device 10 and may be used to supply a user of device 10 with output. Connector ports in device 10 may receive mating connectors (e.g., an audio plug, a connector associated with a data cable such as a Universal Serial Bus cable, a data cable that handles video and audio data such as a cable that connects device 10 to a computer display, television, or other monitor, etc.).

Device 10 may include a display such a display 14. Display 14 may be a liquid crystal display (LCD), a plasma display, an organic light-emitting diode (OLED) display, an electrophoretic display, or a display implemented using other display technologies. A touch sensor may be incorporated into display 14 (e.g., display 14 may be a touch screen display) or display 14 may be insensitive to touch. Touch sensors for display 14 may be resistive touch sensors, capacitive touch sensors, acoustic touch sensors, light-based touch sensors, force sensors, or touch sensors implemented using other touch technologies.

Device 10 may have a one-piece housing or a multi-piece housing. As shown in FIG. 1, for example, electronic device 10 may be a device such as a portable computer or other device that has a two-part housing formed from an upper housing portion such as upper housing 12A and a lower housing portion such as lower housing 12B. Upper housing 12A may include display 14 and may sometimes be referred to as a display housing or lid. Lower housing 12B may sometimes be referred to as a base housing or main housing.

Housings 12A and 12B may be connected to each other using hinge structures located along the upper edge of lower housing 12B and the lower edge of upper housing 12A. For example, housings 12A and 12B may be coupled by hinges 26 such as hinges 26A and 26B that are located at opposing left and right sides of housing 12 along a rotational axis such as axis 22 (sometimes referred to herein as hinge axis 22). A slot-shaped opening such as opening 20 may be formed between upper housing 12A and lower housing 12B and may be bordered on either end by hinges 26A and 26B.

Opening 20 is sometimes also referred to herein as gap 20 or slot 20 between upper housing 12A and lower housing 12B. Hinges 26A and 26B, which may be formed from conductive structures such as metal structures, may allow upper housing 12A to rotate about axis 22 in directions 24 relative to lower housing 12B. Slot 20 extends along the rear edge of lower housing 12B parallel to axis 22. The lateral plane of upper housing (lid) 12A and the lateral plane of lower housing 12B may be separated by an angle that varies between 0° when the lid is closed to 90°, 140°, 160°, 180° or more when the lid is fully opened.

Some of the structures in housing 12 may be conductive. For example, upper housing 12A and lower housing 12B may include conductive housing structures such as metal housing walls. Lower housing 12B may include a clutch barrel along hinge axis 22 such as clutch barrel 28. Clutch barrel 28 may extend outwards from metal housing walls of lower housing 12B towards upper housing 12A (e.g., within slot 20). When upper housing 12A is attached to lower housing 12B, hinges 26A and 26B may be affixed to opposing ends of clutch barrel 28 (e.g., clutch barrel 28 may be laterally opposed to hinges 26A and 26B). Clutch barrel 28 may include springs and/or other clutch mechanisms that allow hinges 26A and 26B and thus upper housing 12A to rotate relative to lower housing 12B about hinge axis 22, while also mechanically holding upper housing 12A in place at a desired angle or orientation relative to lower housing 12B (e.g., intermediate angles between an open position and a closed position of upper housing 12A). Clutch barrel 28 may have walls that are formed from dielectric material and/or metal materials.

To ensure that antenna structures in device 10 function properly, care should be taken when placing the antenna structures relative to the conductive portions of housing 12. In implementations where upper housing 12A and lower housing 12B include metal housing walls, if care is not taken, the metal in the metal housing walls can block the antennas from conveying radio-frequency signals with free space in one or more positions of upper housing 12A relative to lower housing 12B. To mitigate these issues and optimize antenna performance, one or more antennas in device 10 may be mounted within clutch barrel 28 (e.g., overlapping dielectric portions of clutch barrel 28).

For example, one or more antennas may be mounted at one or more locations 8 within clutch barrel 28 (e.g., on either side of a central axis of upper housing 12A and lower housing 12B). Disposing the antennas at these locations may, for example, allow the antennas to convey radio-frequency signals with free space at all orientations of upper housing 12A relative to lower housing 12B (e.g., between and including an open position and a closed position). However, if care is not taken, the metal housing walls of upper housing 12A can still produce uneven capacitive loading of the antennas in clutch barrel 28 across different orientations of upper housing 12A relative to lower housing 12B, which can detune and deteriorate antenna performance.

Figure 2:
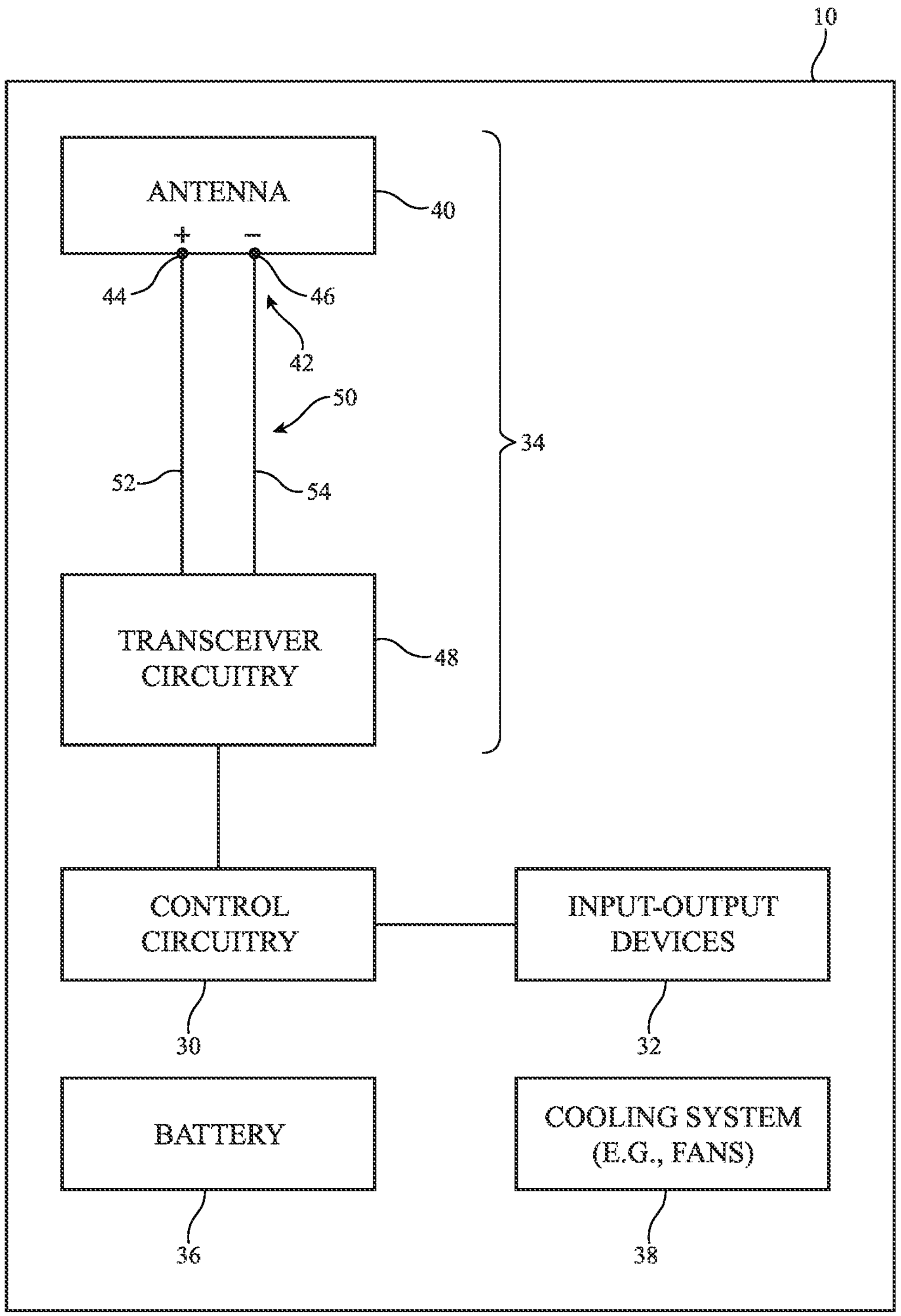
FIG. 2 is a schematic diagram of an illustrative electronic device with wireless circuitry in accordance with some embodiments.

A schematic diagram showing illustrative components that may be used in device 10 is shown in FIG. 2. As shown in FIG. 2, device 10 may include control circuitry such as control circuitry 30. Control circuitry 30 may include storage and/or processing circuitry. Storage in control circuitry 30 may include hard disk drive storage, nonvolatile memory (e.g., flash memory or other electrically-programmable-read-only memory configured to form a solid-state drive), volatile memory (e.g., static or dynamic random-access-memory), etc. Processing circuitry in control circuitry 30 may be used to control the operation of device 10. This processing circuitry may include one or more processors such as microprocessors, microcontrollers, digital signal processors, host processors, baseband processor integrated circuits, application specific integrated circuits, central processing units (CPUs), graphics processing units (GPUs), etc. Control circuitry 30 may be configured to perform operations in device 10 using hardware (e.g., dedicated hardware or circuitry), firmware, and/or software. Software code for performing operations in device 10 may be stored on control circuitry 30 (e.g., storage in control circuitry 30 may include non-transitory (tangible) computer readable storage media that stores the software code). The software code may sometimes be referred to as program instructions, software, data, instructions, or code. Software code stored on the storage may be executed by processing circuitry in control circuitry 30.

Control circuitry 30 may be used to run software on device 10 such as internet browsing applications, voice-over-internet-protocol (VOIP) telephone call applications, email applications, media playback applications, operating system functions, etc. To support interactions with external equipment, control circuitry 30 may be used in implementing communications protocols. Communications protocols that may be implemented using control circuitry 30 include internet protocols, wireless local area network protocols (e.g., IEEE 802.11 protocols-sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, accelerometers, proximity sensors, and other sensors and input-output components.

Device 10 may include wireless communications circuitry 34 that allows control circuitry 30 of device 10 to communicate wirelessly with external equipment. The external equipment with which device 10 communicates wirelessly may be a computer, a cellular telephone, a watch, a router, access point, or other wireless local area network equipment, a wireless base station in a cellular telephone network, a display, a head-mounted device, or other electronic equipment. Wireless communications circuitry 34 may include radio-frequency (RF) transceiver circuitry 48 and one or more antennas such as antenna 40. Configurations in which device 10 contains a single antenna may sometimes be described herein as an example. In general, device 10 may include any number of antennas.

Transceiver circuitry 48 may support communications in Extremely High Frequency (EHF) or millimeter wave communications bands between about 30 GHz and 300 GHz, in centimeter wave communications bands between about 10 GHz and 30 GHz (sometimes referred to as Super High Frequency (SHF) bands), wireless local area network (WLAN) communications bands such as the 2.4 GHZ and 5 GHz Wi-Fi® (IEEE 802.11) bands, wireless personal area network (WPAN) communications bands such as the 2.4 GHz Bluetooth® communications band, cellular telephone communications bands such as a cellular low band (LB) (e.g., 600 to 960 MHZ), a cellular low-midband (LMB) (e.g., 1400 to 1550 MHZ), a cellular midband (MB) (e.g., from 1700 to 2200 MHZ), a cellular high band (HB) (e.g., from 2300 to 2700 MHZ), a cellular ultra-high band (UHB) (e.g., from 3300 to 5000 MHZ, or other cellular communications bands between about 600 MHZ and about 10 THz (e.g., 3G bands, 4G LTE bands, 5G New Radio (NR) Frequency Range 1 (FR1) bands below 10 GHZ, 5G NR FR2 bands between around 10 GHZ and 100 GHz, sub-THz, THz, or THE bands between around 100 GHZ and 10 THz such as 6G bands, etc.), a near-field communications (NFC) band (e.g., at 13.56 MHz), satellite navigations bands (e.g., an L1 global positioning system (GPS) band at 1575 MHz, an L5 GPS band at 1176 MHZ, a Global Navigation Satellite System (GLONASS) band, a BeiDou Navigation Satellite System (BDS) band, etc.), ultra-wideband (UWB) communications band(s) supported by the IEEE 802.15.4 protocol and/or other UWB communications protocols (e.g., a first UWB communications band at 6.5 GHZ and/or a second UWB communications band at 8.0 GHZ), and/or any other desired communications bands. The communications bands handled by the radio-frequency transceiver circuitry may sometimes be referred to herein as frequency bands or simply as "bands," and may span corresponding ranges of frequencies. Transceiver circuitry 48 may include one or more integrated circuits, power amplifier circuitry, low-noise input amplifiers, passive radio-frequency components, switching circuitry, transmission line structures, and other circuitry for handling radio-frequency signals.

If desired, device 10 may be supplied with a battery such as battery 36. Control circuitry 30, input-output devices 32, wireless communications circuitry 34, and power management circuitry associated with battery 36 may produce heat during operation. To ensure that these components are cooled satisfactorily, device 10 may be provided with a cooling system such as cooling system 38. Cooling system 38, which may sometimes be referred to as a ventilation system, may include one or more fans and other equipment for removing heat from the components of device 10. Cooling system 38 may include structures that form airflow ports (e.g., openings in ventilation port structures located along slot 20 of FIG. 1 or other portions of device 10 through which cool air may be drawn by one or more cooling fans and through which air that has been warmed from heat produced by internal components may be expelled). Airflow ports, which may sometimes be referred to as cooling ports, ventilation ports, air exhaust and entrance ports, etc., may be formed from arrays of openings in plastic ventilation port structures or other structures associated with cooling system 38.

Radio-frequency transceiver circuitry 48 and antenna(s) 40 may be used to handle one or more radio-frequency communications bands. For example, transceiver circuitry 48 may include wireless local area network transceiver circuitry that may handle a 2.4 GHz band for WiFi® and/or Bluetooth® communications and, if desired, may include 5 GHz transceiver circuitry (e.g., for WiFi®). If desired, transceiver circuitry 48 and antenna(s) 40 may handle communications in other bands (e.g., cellular telephone bands, near field communications bands, bands at millimeter wave frequencies, etc.).

Transceiver circuitry 48 may convey radio-frequency signals using one or more antennas 40 (e.g., antennas 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to free space through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Antennas 40 in wireless circuitry 34 may be formed using any suitable antenna structures. For example, antennas 40 may include antennas with resonating elements that are formed from stacked patch antenna structures, loop antenna structures, patch antenna structures, inverted-F antenna structures, slot antenna structures, planar inverted-F antenna structures, monopole antenna structures, dipole antenna structures, helical antenna structures, Yagi (Yagi-Uda) antenna structures, dielectric resonator antennas, hybrids of these designs, etc. If desired, one or more of antennas 40 may be cavity-backed antennas. Different types of antennas may be used for different bands and combinations of bands. If desired, antennas 40 may be arranged in one or more phased antenna arrays.

As shown in FIG. 2, transceiver circuitry 48 in wireless communications circuitry 34 may be coupled to antennas such as antenna 40 using radio-frequency transmission line paths such as transmission line 50. Transmission line paths in device 10 such as transmission line 50 may include coaxial cables, microstrip transmission lines, stripline transmission lines, edge-coupled microstrip transmission lines, edge-coupled stripline transmission lines, waveguide transmission lines (e.g., coplanar waveguides, grounded coplanar waveguides, etc.), transmission lines formed from combinations of transmission lines of these types, etc.

Transmission line paths in device 10 such as transmission line 50 may be integrated into rigid and/or flexible printed circuit boards if desired. In one suitable arrangement, transmission line paths in device 10 may include transmission line conductors (e.g., signal and/or ground conductors) that are integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive). Filter circuitry, switching circuitry, impedance matching circuitry, and other circuitry may be interposed within the transmission lines, if desired.

Transmission line 50 in device 10 may be coupled to antenna feed 42 of antenna 40. Antenna 40 of FIG. 2 may, for example, form an inverted-F antenna, a planar inverted-F antenna, a slot antenna, a hybrid inverted-F slot antenna or other antenna having an antenna feed such as antenna feed 42 with a positive antenna feed terminal such as positive antenna feed terminal 44 and a ground antenna feed terminal such as ground antenna feed terminal 46. Transmission line 50 may include a positive transmission line conductor 52 (sometimes referred to herein as signal conductor 52) and a ground transmission line conductor 54 (sometimes referred to herein as ground conductor 54). Signal conductor 52 may be coupled to positive antenna feed terminal 44 and ground conductor 54 may be coupled to ground antenna feed terminal 46. Other types of antenna feed arrangements may be used (e.g., indirect feed arrangements, feed arrangements in which antenna 40 is fed using multiple feeds, etc.) and multiple antennas 40 may be provided in device 10, if desired. The feeding configuration of FIG. 2 is merely illustrative.

Filter circuitry, switching circuitry, impedance matching circuitry, and other circuitry may be interposed within transmission line 50, in or between parts of antenna 40, or in other portions of wireless communications circuitry 34, if desired. Control circuitry 30 may be coupled to transceiver circuitry 48 and input-output devices 32. During operation, input-output devices 32 may supply output from device 10 and may receive input from sources that are external to device 10. Control circuitry 30 may use wireless communications circuitry 34 to transmit and receive wireless signals.

Figure 3:
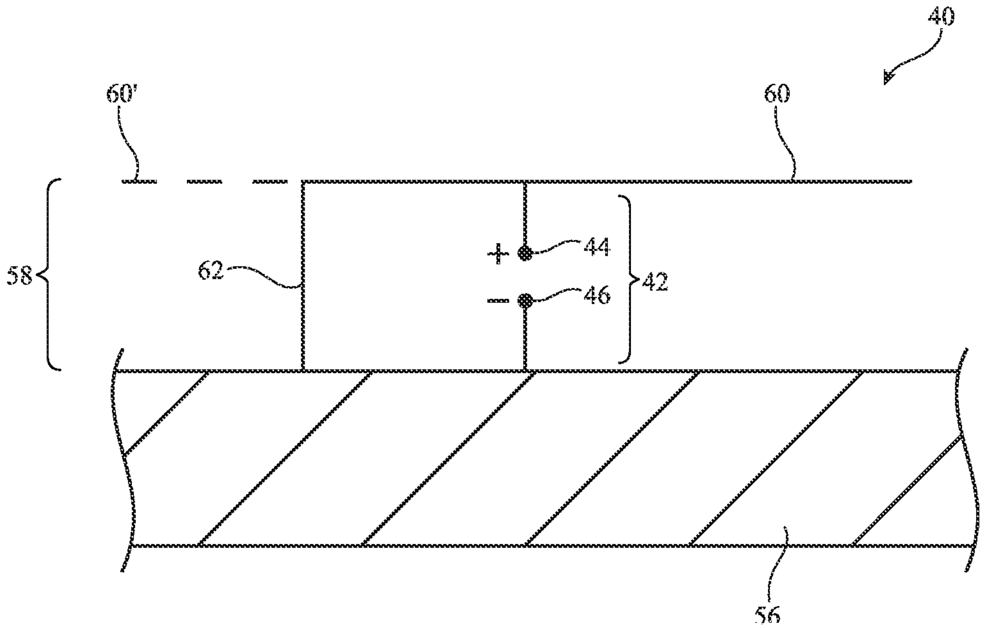
FIG. 3 is a diagram of an illustrative antenna in accordance with some embodiments.

FIG. 3 is a schematic diagram of an illustrative antenna for device 10. In the example of FIG. 3, antenna 40 is an inverted-F antenna having antenna resonating element 58 (e.g., an inverted-F antenna resonating element) and antenna ground 56 (sometimes referred to herein as ground plane 56, ground structures 56, antenna ground structures 56, or ground 56). Antenna resonating element 58 (sometimes referred to herein as antenna radiating element 58, resonating element 58, or radiating element 58) may have one or more antenna resonating element arms such as arm 60. Arm 60 is sometimes also referred to herein as resonating element arm 60, radiating element arm 60, radiating arm 60, resonating arm 60, antenna arm 60, inverted-F arm 60, or inverted-F antenna arm 60. The length of arm 60 may be selected to configure arm 60 to resonate (radiate) in a corresponding frequency band. Arm 60 may, for example, have a length approximately equal to one-quarter of an effective wavelength of operation of antenna 40 (e.g., where the effective wavelength is equal to a free space wavelength multiplied by a constant factor based on the dielectric materials around the arm).

If desired, antenna resonating element 58 may have multiple branches (e.g., a first branch formed from a first arm 60, a second branch formed from a second arm 60', etc.). The lengths of each of the arms (branches) of antenna resonating element 58 may be selected to support communications band resonances at desired frequencies (e.g., a high band resonance may be supported using a shorter branch such as second arm 60' and a low band resonance may be supported using a longer branch such as first arm 60). Second arm 60' may therefore sometimes be referred to herein as high band arm 60' and first arm 60 may sometimes be referred to herein as low band arm 60. Antenna resonances may also be produced from resonating element harmonics and/or using parasitic antenna resonating elements. If desired, the resonance(s) and the operating frequencies of the antenna may be adjusted or tuned over time using one or more tunable components and/or impedance matching circuitry (not shown). The example of FIG. 3 is merely illustrative. Arm 60 may have a linear shape or may have other shapes having any desired number of straight and/or curved segments. Arm 60 may span a finite area and may have any desired number of straight and/or curved edges.

As shown in FIG. 3, antenna resonating element 58 may be coupled to antenna ground 56 by return path 62. Antenna feed 42 may be coupled between one of the arms 60 of antenna 40 and antenna ground 56 in parallel with return path 62. Positive antenna feed terminal 44 may be coupled to one of the arms 60 of antenna 40. Ground antenna feed terminal 46 may be coupled to antenna ground 56. Antenna ground 56 may be formed from metal portions of housing 12 (e.g., portions of lower housing 12B of FIG. 1), metal traces on a printed circuit or other carrier/substrate, internal metal bracket members, sheet metal members, metal foil, conductive gaskets, conductive screws, and/or other conductive structures in device 10. This example is merely illustrative and in general, antenna 40 may include an antenna resonating element having any desired shape and architecture.

Figure 4:
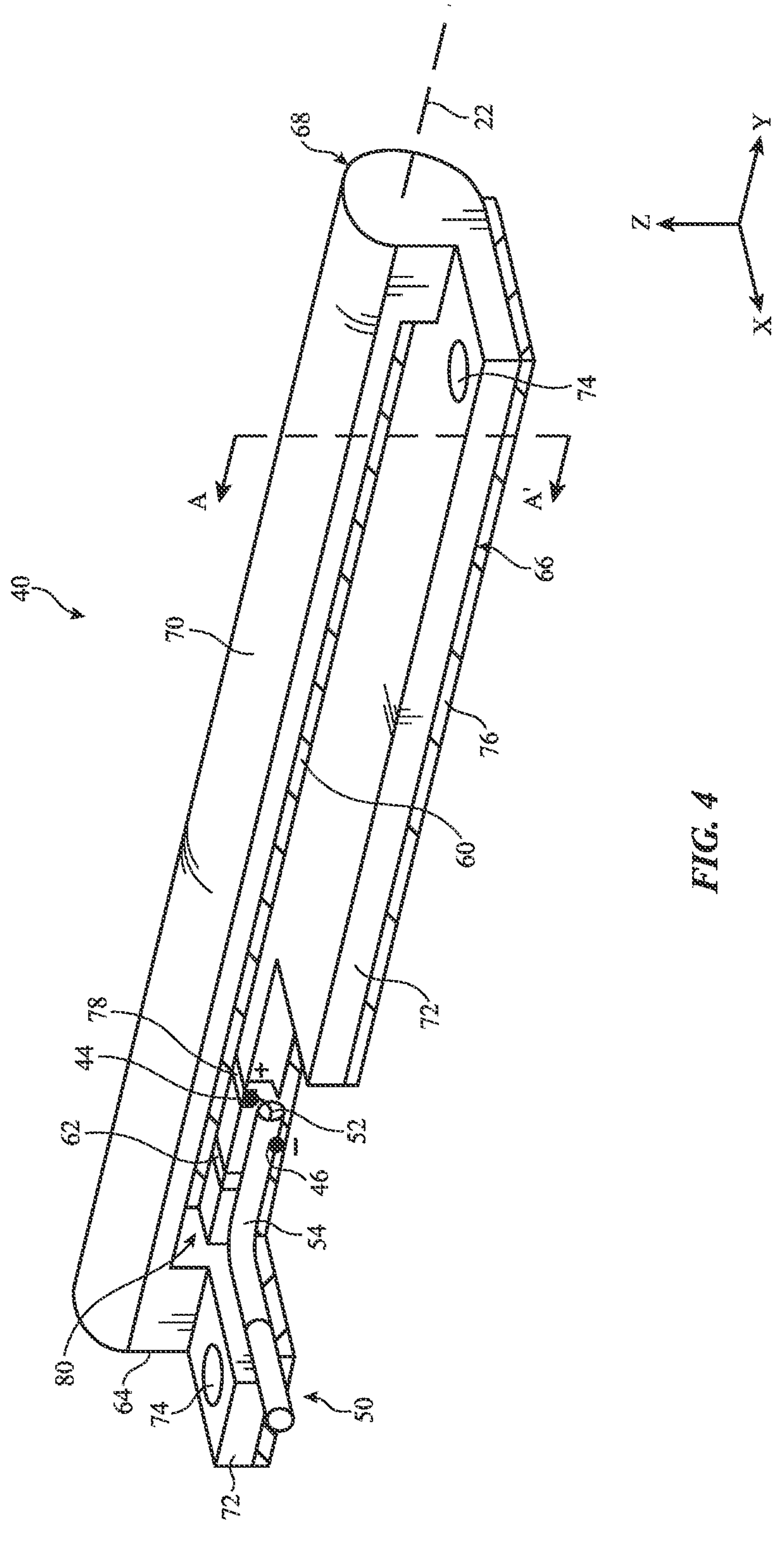
FIG. 4 is a perspective view of an illustrative antenna having a resonating element arm disposed within a cavity of a clutch barrel substrate in accordance with some embodiments.

Implementations in which antenna 40 is an inverted-F antenna of the type shown in FIG. 3 disposed in clutch barrel 28 of lower housing 12B (FIG. 1) are described herein as an example. When disposed in clutch barrel 28, antenna 40 may be disposed on a dielectric support structure in clutch barrel 28 such as a clutch barrel substrate. FIG. 4 is a perspective view showing one example of how antenna 40 may be disposed on a clutch barrel substrate such as clutch barrel substrate 64.

Clutch barrel substrate 64 may be formed from a radio-frequency (RF) transparent dielectric material such as plastic (e.g., injection molded plastic). Clutch barrel substrate 64 may have a barrel portion such as shaft 70 that extends along hinge axis 22 when antenna 40 is disposed within clutch barrel 28 (FIG. 1) (e.g., shaft 70 may have a longitudinal axis parallel to hinge axis 22 and the Y-axis of FIG. 4). Clutch barrel substrate 64 may have one or more ledge portions such as ledges 72 that extend laterally away from an edge of shaft 70 (e.g., within the X-Y plane). Ledges 72 may be provided with one or more holes 74. Holes 74 may receive conductive interconnect structures (not shown) such as conductive screws or other fasteners that help to secure clutch barrel substrate 64 in place within clutch barrel 28 of lower housing 12B.

Clutch barrel substrate 64 may have a lower surface 66. Lower surface 66 may be planar or may lie in a curved surface. Shaft 70 may have an exterior surface 68 that extends away from lower surface 66, around shaft 70 and hinge axis 22 to the opposing side of clutch barrel substrate 64. Exterior surface 68 is curved. Exterior surface 68 may have a cylindrical curvature (e.g., about hinge axis 22) or another curvature. Grounded conductive structures such as ground layer 76 may be layered onto lower surface 66 of clutch barrel substrate 64. Ground layer 76 may include conductive traces patterned, printed, or plated onto lower surface 66, sheet metal, metal foil, a conductive gasket, a conductive wall of lower housing 12B (FIG. 1), and/or other conductive materials. Ground layer 76 may be held at a ground potential and may form part of the antenna ground 56 (FIG. 3) of antenna 40.

Clutch barrel substrate 64 may have an interior cavity such as cavity 80. Cavity 80 extends into shaft 70 from ledge 72 towards exterior surface 68 of shaft 70. Cavity 80 may have a longitudinal axis that extends along hinge axis 22. Shaft 70 may have a curved interior surface within cavity 80. The curved interior surface may extend parallel to exterior surface 68 if desired (e.g., may lie in a surface parallel to exterior surface 68).

Arm 60 of antenna 40 may be disposed on the curved interior surface of cavity 80 (e.g., within cavity 80). Disposing arm 60 within cavity 80 may serve to mount antenna 40 as close to free space as possible within the clutch barrel while also preventing the antenna from being exposed to the exterior of device 10, thereby preventing damage, contamination, and/or detuning of the antenna by external objects. Arm 60 may extend along the longitudinal axis of shaft 70 and cavity 80 (e.g., arm 60 may have a longitudinal axis parallel to hinge axis 22).

Antenna 40 may be fed by a corresponding transmission line 50 (e.g., a coaxial cable). Transmission line 50 may extend into cavity 80. Transmission line 50 may have a ground conductor 54 (e.g., an outer coaxial conductor) and a signal conductor 52 (e.g., an inner coaxial conductor). Signal conductor 52 may be coupled to a feed leg 78 of antenna 40 at positive antenna feed terminal 44. Feed leg 78 may extend away from arm 60 and/or out of cavity 80. Alternatively, feed leg 78 may be omitted and positive antenna feed terminal 44 may be coupled directly to arm 60.

Antenna 40 may also have a return path 62 (e.g., a return path leg) that extends away from arm 60, out of cavity 80, and downwards to ground layer 76 (e.g., return path 62 may couple arm 60 to ground layer 76). The ground conductor 54 of transmission line 50 may be coupled to ground layer 76 at ground antenna feed terminal 46.

Figure 5:
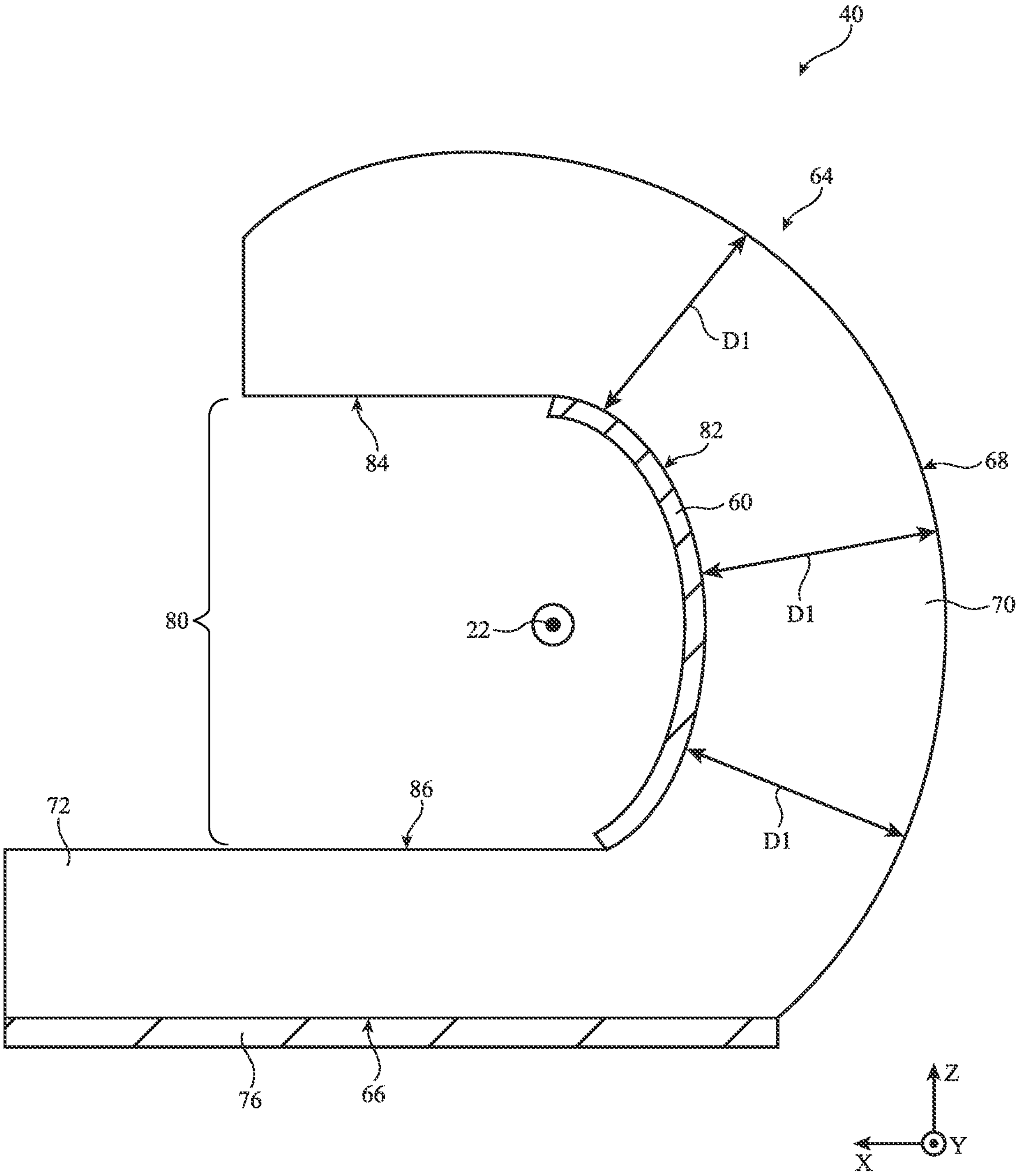
FIG. 5 is a cross-sectional side view of an illustrative resonating element arm disposed within a cavity of a clutch barrel substrate in accordance with some embodiments.

FIG. 5 is a cross-sectional side view showing how arm 60 of antenna 40 may be disposed within cavity 80 of clutch barrel substrate 64 (e.g., as taken in the direction of arrow AA' of FIG. 4). As shown in FIG. 5, shaft 70 of clutch barrel substrate 64 may extend upwards and away from ledge 72 and may wrap around hinge axis 22. Outer surface 68 may extend upwards and away from lower surface 66 of ledge 72 and may wrap around hinge axis 22. Outer surface 68 may, for example, lie in a first curved surface with a first radius of curvature (e.g., a cylindrical curvature) around a line parallel to the Y-axis that lies within or adjacent to cavity 80 (e.g., hinge axis 22).

Shaft 70 may include cavity 80. Cavity 80 may have cavity walls (edges) defined by interior surfaces 84, 86, and 82 of shaft 70. Interior surface 84 may extend from exterior surface 68 to interior surface 82. Interior surface 82 may extend from interior surface 84 to interior surface 86. Interior surface 86 may extend from interior surface 82 onto ledge 72. Interior surfaces 84 and 86 may be planar, may be curved, or may have planar and curved portions. Cavity 80 may be vertically interposed between interior surface 84 and interior surface 86. Interior surface 84 and/or interior surface 82 may be vertically interposed between hinge axis 22 and exterior surface 68. Interior surface 86 and/or interior surface 82 may be vertically interposed between hinge axis 22 and lower surface 66.

Interior surface 82 of shaft 70 is curved. Interior surface 82 is therefore sometimes also referred to herein as curved interior surface 82 or curved surface 82. Interior surface 82 may extend upwards away from interior surface 86 and may wrap around hinge axis 22 to interior surface 84. Interior surface 82 may, for example, lie in a second curved surface with a second radius of curvature (e.g., a cylindrical curvature) around a line parallel to the Y-axis that lies within or adjacent to cavity 80 (e.g., hinge axis 22).

Arm 60 of antenna 40 may be layered onto interior surface 82. Arm 60 may, for example, be formed from conductive traces that are patterned, printed, and/or plated onto interior surface 82 (e.g., using a laser direct structuring (LDS) process or a plating over plastic (POP) process). Arm 60 may be formed from copper or other conductive materials. Arm 60 may therefor lie in a third curved surface with the same radius of curvature as interior surface 82. In other words, arm 60 may extend along its own longitudinal axis parallel to the Y-axis and may be curved about its own longitudinal axis parallel to the Y-axis (e.g., arm 60 may lie on a segment of the surface area of a cylinder centered about an axis parallel to the Y-axis). This is merely illustrative and, in general, arm 60 may have other curvatures (e.g., a freeform curvature). The remainder of cavity 80 may be filled with air or a dielectric material such as epoxy, foam, plastic (e.g., an additional shot of injection molded plastic), or an encapsulant (e.g., arm 60 may be embedded within shaft 70).

If desired, interior surface 82 and thus arm 60 may be separated from exterior surface 68 by a single uniform distance D1 across the entire lateral area of arm 60 about hinge axis 22. Put differently, the surface of arm 60, interior surface 82, and exterior surface 68 may all be curved, may all be parallel to each other, and/or may all exhibit the same radius of curvature, and/or shaft 70 may have a single uniform thickness equal to distance D1 across the entire lateral area of arm 60 (e.g., as measured in the direction of the normal axes of inner surface 82 at all points overlapping arm 60). This may, for example, prevent non-uniformities in the capacitive loading of arm 60 by the metal walls of upper housing 12A (FIG. 1) as the upper housing rotates relative to the lower housing, thereby maximizing the efficiency and bandwidth of antenna 40 at all orientations of the upper housing relative to the lower housing.

Figure 6:
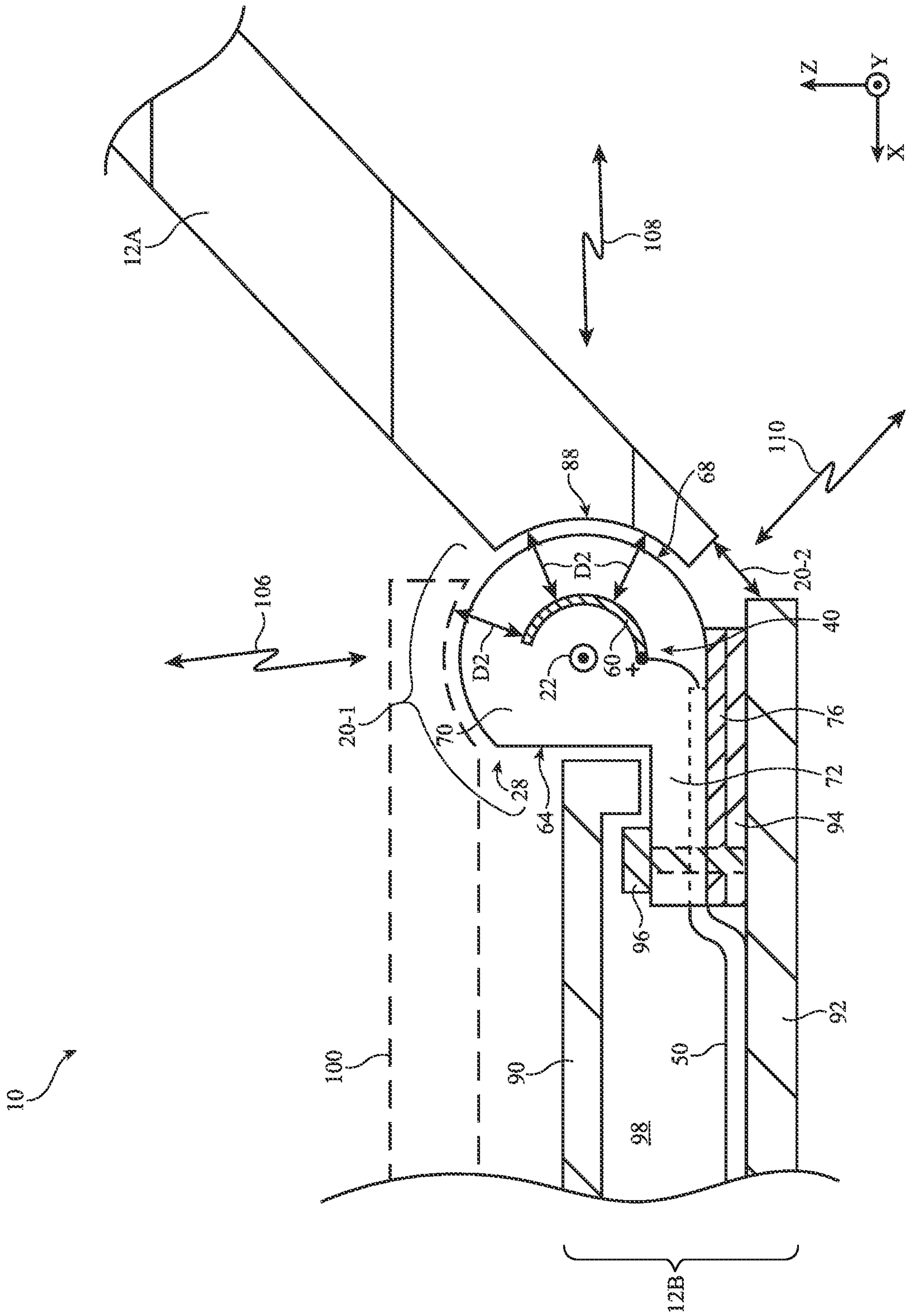
FIG. 6 is a cross-sectional side view showing how an illustrative antenna of the type shown in FIGS. 4 and 5 may be disposed within the clutch barrel of a laptop computer in accordance with some embodiments.

FIG. 6 is a cross-sectional side view showing how clutch barrel substrate 64 and antenna 40 may be mounted within clutch barrel 28 of device 10. As shown in FIG. 6, lower housing 12B may have an upper metal wall 90 and a lower metal wall 92 that surround and enclose an interior volume 98 of lower housing 12B. Keyboard 16 and track pad 18 of FIG. 1 may be mounted to metal wall 90 of lower housing 12B.

Clutch barrel substrate 64 may be mounted to lower housing 12B to form the clutch barrel 28 of device 10. Ledge 72 of clutch barrel substrate 64 may extend into interior volume 98 of lower housing 12B (e.g., along lower metal wall 92). Shaft 70 of clutch barrel substrate 64 may protrude out of interior volume 98 and lower housing 12B and into the slot 20 (FIG. 1) between lower housing 12B and upper housing 12A. Exterior surface 68 of shaft 70 may protrude vertically above upper housing wall 90 of lower housing 12B if desired.

One or more conductive interconnect structures such as conductive interconnect structure 96 may attach clutch barrel substrate 64 to lower metal wall 92. Conductive interconnect structure 96 may, for example, include a conductive screw that extends through a corresponding hole 74 (FIG. 4) in ledge 72 to a threaded hole or screw boss on lower metal wall 92. A conductive gasket 94 may be layered under the ground layer 76 on clutch barrel substrate 64 and may couple ground layer 76 to lower metal wall 92. Conductive gasket 94 may electrically short ground layer 76 to lower metal wall 92. This may, for example, configure lower metal wall 92, conductive gasket 94, and ground layer 76 to all form part of the antenna ground for antenna 40. Conductive interconnect structure 96 may also electrically short ground layer 76 to lower metal wall 92. In general, conductive interconnect structure may include other conductive interconnects such as conductive springs, conductive pins, conductive clips, conductive brackets, conductive adhesive, conductive foam, conductive gaskets, conductive prongs, conductive blades, welds, solder, etc. Transmission line 50 may extend into clutch barrel substrate 64 and may be coupled to arm 60 within shaft 70.

As shown in FIG. 6, upper housing 12A may be mounted (e.g., hingeably coupled) to clutch barrel 28. Housing 12A may be rotated between an open position, as shown in FIG. 6, and a closed position such as position 100. When in the open position, there is both an upper slot 20-1 between upper metal wall 90 of lower housing 12B and upper housing 12A and a lower slot 20-2 between lower metal wall 92 of lower housing 12B and upper housing 12A. Antenna 40 may convey radio-frequency signals through upper slot 20-1, as shown by arrow 106, and through lower slot 20-2, as shown by arrow 110. In other words, when upper housing 12A is in the upper position, antenna 40 has a first field of view through upper slot 20-1 and has a second field of view through lower slot 20-2.

As upper housing 12A rotates about hinge axis 22 to intermediate angles between the open position and closed position 100, the size of upper slot 20-1 decreases (thereby decreasing the field of view of antenna 40 through upper slot 20-1) and the size of lower slot 20-2 increases (thereby increasing the field of view of antenna 40 through lower slot 20-2). The cumulative field of view of antenna 40 through upper slot 20-1 and lower slot 20-2 may remain substantially constant over time (e.g., as high as 180 degrees or more). This may, for example, help to allow antenna 40 to maintain consistent levels of wireless performance and a stable wireless link with external equipment even as upper housing 12A is rotated to closed position 100 and even as the preferred viewing angle for the display on device 10 changes for a given user (or between users) over time. When upper housing 12A is in closed position 100, upper slot 20-1 is removed and lower slot 20-2 exhibits a maximum area (field of view). Antenna 40 may then convey radio-frequency signals through lower slot 20-2 while upper housing 12A is in closed position 100, as shown by arrow 108.

As shown in FIG. 6, upper housing 12A may have a conductive surface 88 at or facing clutch barrel 28, shaft 70 of clutch barrel substrate 64, and antenna 40. Conductive surface 88 may be curved (e.g., may be formed from a curved metal housing wall of upper housing 12A at or facing clutch barrel 28). Since conductive surface 88 and arm 60 of antenna 40 are both conductive, there exists a non-zero capacitance between arm 60 and conductive surface 88. The capacitance depends on the separation between arm 60 and conductive surface 88. Since arm 60 extends across a relatively large area, if care is not taken, this capacitance can vary at different points across arm 60 and/or as upper housing 12A rotates across intermediate angles from the open position to closed position 100. This variation in capacitance across arm 60 and/or across orientations of upper housing 12A can vary the impedance (capacitive) loading of arm 60 as a function of time and/or lid orientation. This variation in impedance can undesirably detune antenna 40 and/or can limit the efficiency and/or bandwidth of antenna 40, particularly as the user changes the orientation of upper housing 12A over time.

To mitigate these issues, interior surface 82 (FIG. 5) of clutch barrel substrate 64 and thus arm 60 may exhibit the same curvature as conductive surface 88 of upper housing 12A. Put differently, interior surface 82 (FIG. 5) of shaft 70 and arm 60 may lie in curved surfaces that extend parallel to conductive surface 88 of upper housing 12A. This may ensure that there exists a single uniform distance D2 between arm 60 and conductive surface 88 of upper housing 12A at each point on arm 60, at all orientations of upper housing 12A from the open position to the closed position. In other words, even as upper housing 12A rotates about hinge axis 22 from the open position to the closed position, there remains a single uniform distance D2 between each point on the surface of arm 60 (e.g., as measured in the normal/orthogonal direction to that point) and the overlapping portion of conductive surface 88 of upper housing 12A (e.g., regardless of the orientation of upper housing 12A). This ensures that conductive surface 88 of upper housing 12A always provides the same impedance (capacitive) loading to all points on arm 60 at all positions of upper housing 12A. This serves to prevent detuning of antenna 40 as upper housing 12A is rotated to different orientations, thereby maximizing the efficiency and bandwidth of antenna 40 across all orientations of upper housing 12A. At the same time, arm 60 is located as far as possible from other metals in the system, is hidden from view, is protected from touch events or contaminants that can affect antenna performance, and is stationary relative to upper housing 12A.

If desired, clutch barrel substrate 64 may include multiple antennas 40 mounted in shaft 70 in this way (e.g., at different locations along hinge axis 22). If desired, clutch barrel include metallizations (e.g., metal patches, grounded metal arms, parasitic elements, etc.) between adjacent antennas 40 to help isolate the antennas from each other.

Figure 7:
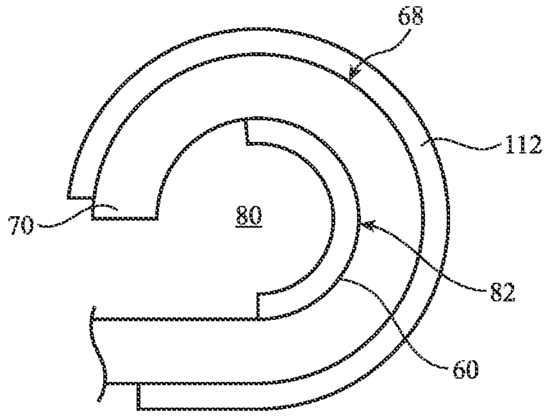
FIG. 7 is a cross-sectional side view of an illustrative clutch barrel substrate having a dielectric cover layer in accordance with some embodiments.

If desired, shaft 70 of clutch barrel substrate 64 may be provided with a curved dielectric cover layer. FIG. 7 is a cross-sectional side view showing one example of how shaft 70 may be provided with a curved dielectric cover layer. As shown in FIG. 7, a dielectric cover layer such as dielectric cover layer 122 may be layered over exterior surface 68 of shaft 70. Dielectric cover layer 122 may, for example, exhibit the same curvature as exterior surface 68 and/or may lie in a curved surface parallel to exterior surface 68, interior surface 82, and/or arm 60. Dielectric cover layer 122 may be formed from ceramic, as one example.

Figure 8:
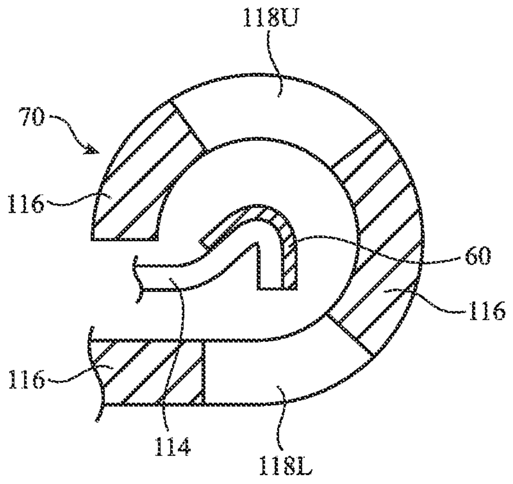
FIG. 8 is a cross-sectional side view of an illustrative clutch barrel substrate having conductive portions and dielectric portions in accordance with some embodiments.

If desired, shaft 70 of clutch barrel substrate 64 may be provided with both conductive portions and dielectric portions. FIG. 8 is a cross-sectional side view showing one example of how shaft 70 may be provided with both conductive portions and dielectric portions. As shown in FIG. 8, shaft 70 may have one or more metal portions 116 and one or more dielectric (e.g., plastic) windows 118 that separate metal portions 116. Windows 118 may include an upper window 118U (e.g., for radiating through slot 20-1 of FIG. 6) and a lower window 118L (e.g., for radiating through slot 20-2 of FIG. 6), as one example. In these examples, arm 60 may be disposed on one of windows 118 or on a dielectric carrier 114 such as a plastic support or a flexible printed circuit (e.g., to prevent the arm from shorting to metal portions 116). Dielectric carrier 114 may be layered onto a metal portion 116 if desired (e.g., to serve as an insulator between arm 60 and the metal portion). If desired, dielectric cover layer 112 (FIG. 7) may cover metal portions 116 and dielectric portions 118 of shaft 70.

As used herein, the term "concurrent" means at least partially overlapping in time. In other words, first and second events are referred to herein as being "concurrent" with each other if at least some of the first event occurs at the same time as at least some of the second event (e.g., if at least some of the first event occurs during, while, or when at least some of the second event occurs). First and second events can be concurrent if the first and second events are simultaneous (e.g., if the entire duration of the first event overlaps the entire duration of the second event in time) but can also be concurrent if the first and second events are non-simultaneous (e.g., if the first event starts before or after the start of the second event, if the first event ends before or after the end of the second event, or if the first and second events are partially non-overlapping in time). As used herein, the term "while" is synonymous with "concurrent."

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made by those skilled in the art without departing from the scope and spirit of the described embodiments. The foregoing embodiments may be implemented individually or in any combination.

What is claimed is:

1. A laptop computer comprising:

a lower housing having an upper metal wall and a lower metal wall that define an interior volume of the lower metal housing;

an upper housing coupled to the lower housing by a hinge, the upper housing having a curved metal wall;

a dielectric substrate mounted to the lower housing and extending out of the interior volume towards the upper housing; and an antenna having a radiating arm on the dielectric substrate, wherein the radiating arm lies in a curved surface parallel to the curved metal wall.

2. The laptop computer of claim 1, further comprising:

a clutch barrel, wherein the dielectric substrate is disposed in the clutch barrel, the hinge couples the upper housing to the clutch barrel, and the curved metal wall faces the clutch barrel.

3. The laptop computer of claim 1, wherein the dielectric substrate has a shaft that extends along a hinge axis of the hinge, the radiating arm being disposed in the shaft.

4. The laptop computer of claim 3, wherein the shaft has a cavity with a curved interior surface, the radiating arm being layered onto the curved interior surface.

5. The laptop computer of claim 4, wherein the radiating arm comprises a conductive trace patterned onto the curved interior surface.

6. The laptop computer of claim 4, wherein the dielectric substrate has a ledge extending away from the shaft and a ground layer on a lower surface of the ledge and the shaft.

7. The laptop computer of claim 6, wherein the antenna has a feed leg that extends out of the cavity and has a return path that couples the radiating arm to the ground layer, further comprising:

a radio-frequency transmission line having a signal conductor coupled to the feed leg and having a ground conductor coupled to the ground layer.

8. The laptop computer of claim 1, wherein the upper housing is rotatable between an open position and a closed position, the antenna being configured to:

radiate through a first slot between the upper metal wall and the upper housing when the upper housing is in the open position;

radiate through a second slot between the lower metal wall and the upper housing when the upper housing is in the closed position; and radiate through the second slot when the upper housing is in the closed position.

9. The laptop computer of claim 1, wherein the curved surface remains parallel to the curved metal wall as the upper housing is rotated from an open position to a closed position.

10. The laptop computer of claim 1, wherein the dielectric substrate has an exterior surface that extends parallel to the curved surface and the curved metal wall.

11. The laptop computer of claim 10, further comprising:

a curved ceramic layer disposed on the exterior surface of the dielectric substrate.

12. A laptop computer comprising:

a lower housing having an upper metal wall and a lower metal wall that define an interior volume of the lower metal housing;

a clutch barrel mounted to the lower housing and extending out of the interior volume;

an upper housing coupled to the clutch barrel by a hinge, the upper housing having a curved metal surface facing the clutch barrel; and an antenna resonating element arm in the clutch barrel, wherein the antenna resonating element arm has a lateral area and is separated from the curved metal surface by a uniform distance across the lateral area.

13. The laptop computer of claim 12, wherein the upper housing is rotatable from an open position to a closed position relative to the lower housing, the antenna resonating element arm being separated from the curved metal surface by the uniform distance across the lateral area when the upper housing is in the open position.

14. The laptop computer of claim 12, wherein the upper housing is rotatable from an open position to a closed position relative to the lower housing, the antenna resonating element arm being separated from the curved metal surface by the uniform distance across the lateral area when the upper housing is in the closed position.

15. The laptop computer of claim 14, wherein the antenna resonating element arm is separated from the curved metal surface by the uniform distance across the lateral area when the upper housing is at an intermediate angle between the open position and the closed position.

16. The laptop computer of claim 15, wherein the antenna resonating element arm is separated from the curved metal surface by the uniform distance across the lateral area when the upper housing is at all angles between the open position and the closed position.

17. The laptop computer of claim 12, wherein the clutch barrel comprises:

a plastic substrate having a shaft that extends along a hinge axis of the hinge and having a ledge extending away from the shaft and attached to the lower metal wall, the shaft having a cavity with a curved interior surface, the antenna resonating element arm comprising a conductive trace that is patterned onto the curved interior surface, and the antenna resonating arm having a longitudinal axis parallel to the hinge axis.

18. An electronic device comprising:

a housing having an upper housing portion that contains a display and having a lower housing portion, wherein the lower housing portion has opposing first and second conductive walls;

a clutch barrel mounted to the lower housing portion;

a hinge that couples the upper housing portion to the lower housing portion at the clutch barrel, wherein the upper housing portion is rotatable with respect to the lower housing portion and has a curved metal surface facing the clutch barrel;

a dielectric substrate in the clutch barrel and having a curved interior surface that extends parallel to the curved metal surface; and an inverted-F antenna resonating element arm on the curved interior surface of the dielectric substrate.

19. The electronic device of claim 18, wherein the inverted-F antenna resonating element arm has a lateral area and is separated from the curved metal surface by a uniform distance across the lateral area.

20. The laptop computer of claim 1, wherein the curved metal wall has an additional curved surface facing the lower housing, wherein the additional curved surface and the radiating arm are parallel to the curved surface.

* * * * *